US008406473B2

(12) United States Patent
Tanaka

(10) Patent No.: US 8,406,473 B2
(45) Date of Patent: Mar. 26, 2013

(54) INFORMATION PROCESSING APPARATUS AND INFORMATION PROCESSING METHOD

(75) Inventor: Shuya Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 507 days.

(21) Appl. No.: 12/633,585

(22) Filed: Dec. 8, 2009

(65) Prior Publication Data

US 2010/0150456 A1 Jun. 17, 2010

(30) Foreign Application Priority Data

Dec. 11, 2008 (JP) ................................ 2008-316036

(51) Int. Cl.
*G06K 9/00* (2006.01)

(52) U.S. Cl. ....................................................... 382/107

(58) Field of Classification Search .................. 382/100, 382/107, 219

See application file for complete search history.

(56) References Cited

U.S. PATENT DOCUMENTS 6,856,249 B2 * 2/2005 Strubbe et al. ............ 340/573.1
7,605,709 B2 * 10/2009 Tolliver ...................... 340/573.1
2001/0010541 A1 8/2001 Fernandez
2003/0107650 A1 6/2003 Colmenarez
2004/0117638 A1 6/2004 Monroe
2006/0045354 A1 3/2006 Hanna
2006/0065354 A1 3/2006 Mischler
2006/0067562 A1 3/2006 Kamath

FOREIGN PATENT DOCUMENTS

EP 1696396 A2 8/2006
JP 62-086990 A 4/1987
JP 2000-331254 A 11/2000
JP 2005-117635 A 4/2005
JP 2006-143450 A 6/2006
WO 03075243 A1 9/2003
WO 2005091211 A1 9/2005
WO 2006106496 A1 10/2006

* cited by examiner

*Primary Examiner* — Bhavesh Mehta
*Assistant Examiner* — Shefali Goradia
(74) *Attorney, Agent, or Firm* — Canon USA Inc IP Division

(57) ABSTRACT

An information processing apparatus and method for processing an input image by comparing a stored background image with the input image to obtain a difference, collating a change in the difference and time of the change with conditions for the occurrence of a periodic event and information as to the time of occurrence of the periodic event, which are previously stored in a storage unit, to determine whether the change in state of the input image is the periodic or a non-periodic movement of an object, and selecting, according to a result of the determination, any one of operations according to the periodic or the non-periodic movement of an object.

14 Claims, 16 Drawing Sheets

INFORMATION PROCESSING APPARATUS AND INFORMATION PROCESSING METHOD

BACKGROUND OF THE INVENTION

1. Field of the Invention

The present invention relates to a technique for discriminating a change in state of an image input from a camera.

2. Description of the Related Art

Monitoring apparatuses, such as a monitoring camera, which compare a difference between a current image input from a camera and a reference background image to detect any portion of the image that has changed are known. Apparatuses of this type output a signal which is used for a display or a warning on a monitoring screen to notify that an object is left unattended or has been taken away, if the duration for which the change has been detected exceeds a predetermined time (refer to Japanese Patent Application Laid-Open No. 2000-331254).

The apparatus discussed in the Japanese Patent Application Laid-Open No. 2000-331254 uses an object movement detection system, which determines that there is a change when the duration for which the change has been detected exceeds a predetermined time. Accordingly, a warning can be provided regarding the appearance of an object (i.e., the object is left unattended) or the disappearance of an object (i.e., the object is taken away) if detected.

There may be a scene in which an object similar in size moves to the same position at the same time, such as a milk bottle, or a newspaper periodically delivered every morning, a delivery car of a convenience store or a mail truck periodically circulating every day. The appearance and the disappearance of an object as scheduled may have been previously approved, so that it is inconvenient, in view of a monitoring efficiency, for a user to be called to a monitor, or asked to confirm a monitor or visit a questionable site each time an object is left unattended or an object is taken away.

As described above, until now, the appearance and the disappearance of an object, which occurs periodically, could not have been discriminated from the appearance and the disappearance of an object, which occur non-periodically.

SUMMARY OF THE INVENTION

The present invention is directed to an information processing apparatus capable of accurately discriminating whether an object is periodically moved or non-periodically moved, and an information processing method therefor.

According to an aspect of the present invention, an information processing apparatus includes: a background image storage unit configured to store a background image; a periodic event storage unit configured to store conditions for the occurrence of a periodic event and information as to the time of the occurrence of the periodic event; an image input unit configured to input an image; an image comparison unit configured to compare the background image in the background image storage unit with an input image inputted from the image input unit to obtain a difference; a periodic event collation unit configured to collate a change in the difference and time of the change with the conditions for the occurrence and the information as to the time of the occurrence stored in the periodic event storage unit to determine whether the change in the state of the input image is the periodic or the non-periodic movement of an object; and a selection unit configured to select, according to the result of the determination, any of operations according to the periodic or the non-periodic movement of an object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
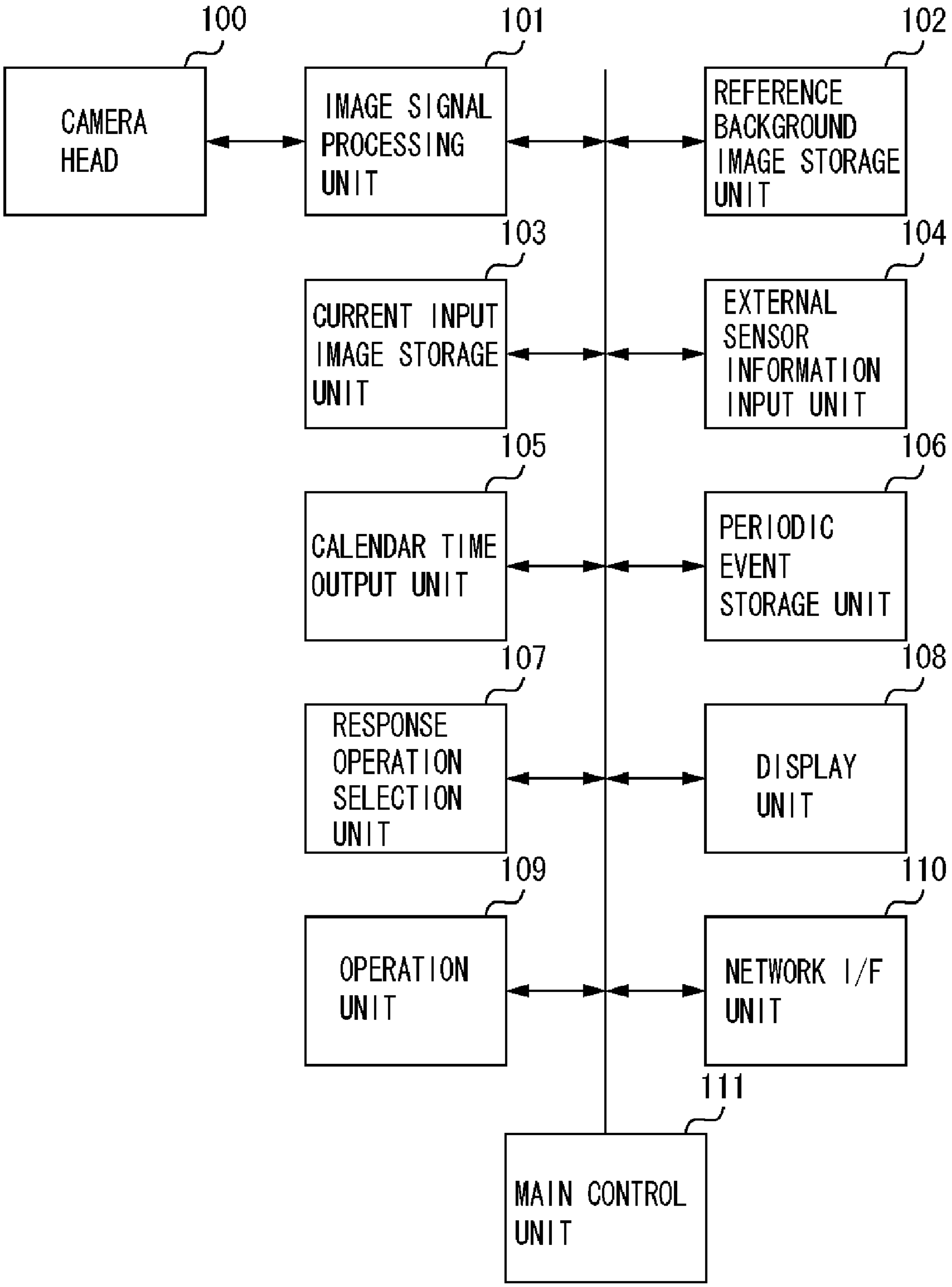
FIG. 1 is a block diagram of a camera system according to an exemplary embodiment of the present invention.

FIG. 1 is a block diagram of a camera system according to an exemplary embodiment of the present invention. A camera head 100 has a function for inputting an image. An image signal processing unit 101 converts the signal output from the camera head 100 to a standardized image signal and then outputs digital image data as an input image.

A reference background image storage unit 102 stores a background image used as a reference for comparison. A current input image storage unit 103 stores a current input image output from the image signal processing unit 101.

An external sensor information input unit 104 obtains external sensor information such as temperature and weight. A calendar time output unit 105 outputs calendar information and time information.

A periodic event storage unit 106 stores occurrence time information and conditions for each periodic event, such as time zone, place, size, color, shape, weight, and temperature.

A response operation selection unit 107 selects a corresponding operation performed in the case where it is determined that an object is non-periodically moved or an object is periodically moved.

A display unit 108 displays the image stored in the current input image storage unit 103 or is used for various settings. An operation unit 109 is used for inputting information for the various settings.

A network interface unit 110 is used to transmit the input image to a PC connected through a network or receives various remote control commands from the PC.

A main control unit 111 integrally controls each unit and executes the processes illustrated in the flow charts.

Figure 2:
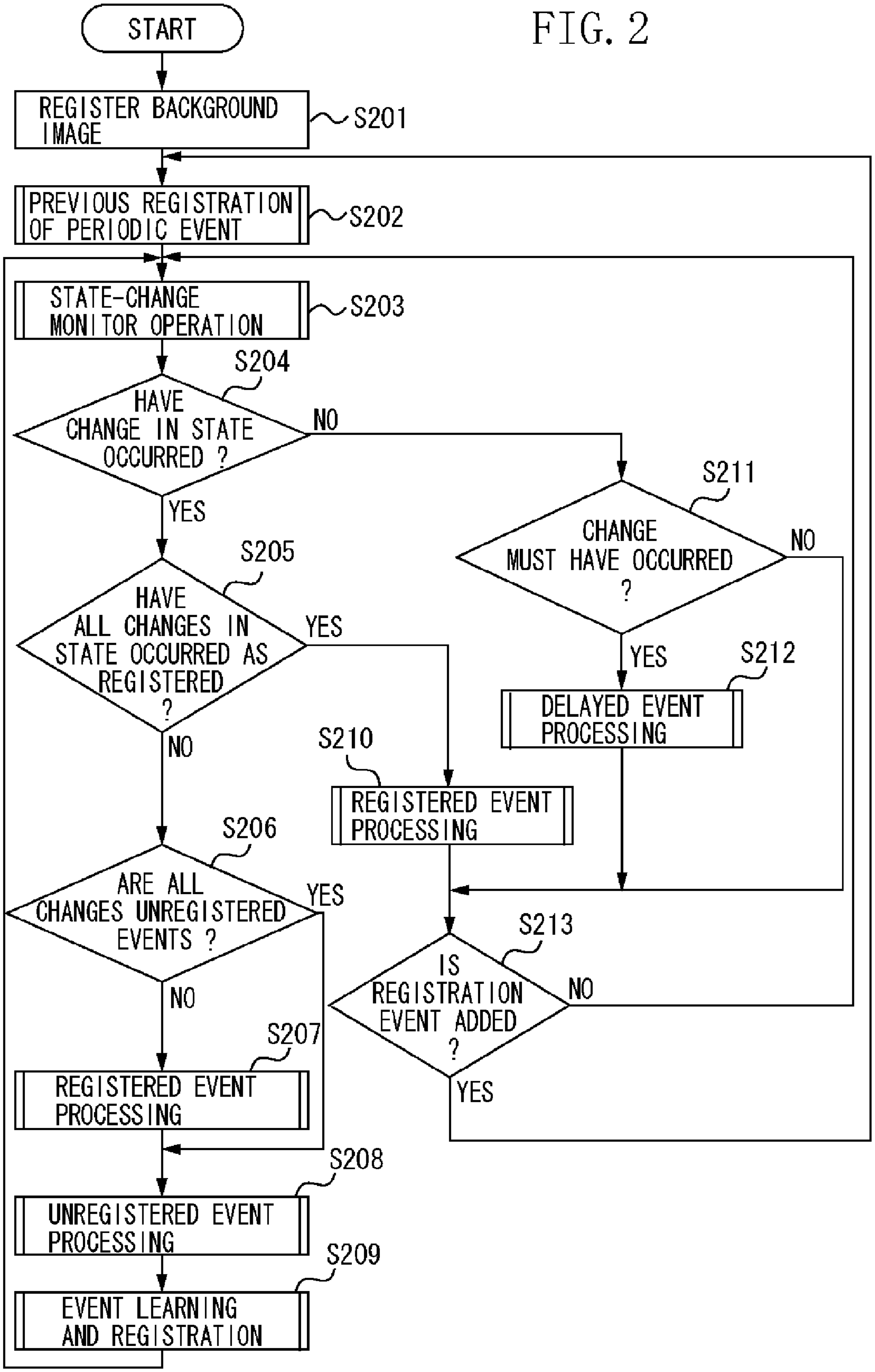
FIG. 2 illustrates a main flowchart of a main control unit.

FIG. 2 is a main flowchart executed by the main control unit 111 to control the camera system.

In step S201, a background image is initially registered as a reference image before the operation of a system is started. In step S202, a periodic event is previously registered before the operation of the system is started. A detailed processing in step S202 is described below referring to FIGS. 3 and 4.

In step S203, a change in state is monitored based on a current input image. A detailed process in the present step is described below referring to FIG. 5. In step S204, it is determined whether a change in state occurs as a result of the monitor operation in step S203. If a change in state occurs (YES in step S204), the processing proceeds to step S205. Otherwise (NO in step S204), the processing proceeds to step S211.

In step S204, if it is determined that a change in state occurs (YES in step S204), then in step S205, it is determined whether all the changes in state occur as registered. If all the changes occur (YES in step S205), the processing proceeds to step S210. Otherwise (NO in step S205), the processing proceeds to step S206.

In step S205, if it is determined that all the changes in state do not occur as registered (NO in step S205), then in step S206, it is determined whether all the changes are unregistered events. In step S206, if it is determined that all the changes are unregistered events (YES in step S206), the processing proceeds to step S208. Otherwise (NO in step S206), the processing proceeds to step S207.

In step S207, image transfer processing and a message display processing are performed according to the registered periodic event through the selection of the response operation selection unit 107. Detailed processing in step S207 is described in FIG. 9.

In step S208, image transfer processing and an alert generation processing are performed according to an unregistered and non-periodic event based on the selection of the response operation selection unit 107. Detailed processing in step S208 is described below referring to FIG. 8.

In step S209, if a change in state is unregistered but periodically occurs, the change is learned and automatically registered as a periodic event. Then, the processing returns to step S203. Detailed processing in step S209 is described below referring to FIG. 11.

In step S205, if it is determined that all the changes in state occur as registered (YES in step S205), then in step S210, image transfer processing and message display processing are performed according to the registered periodic event based on the selection of the response operation selection unit 107. Then, the processing proceeds to step S213. Detailed processing in step S210 is described below referring to FIG. 9.

In step S204, if it is determined that a change in state does not occur (NO in step S204), then, in step S211, it is determined whether a change in state must have occurred if it agrees with the registration. If a change in state must have occurred (YES in step S211), the processing proceeds to step S212. Otherwise (NO in step S211), the processing proceeds to step S213.

In step S211, if it is determined that a change in state must have occurred if it agrees with the registration (YES in step S211), then, in step S212, image transfer processing and alert display processing are performed according to a delayed event and then the processing proceeds to step S213. Detailed processing in step S212 is described below referring to FIG. 10.

In step S213, it is determined whether a request for adding a new periodic event is made. If the request is made (YES in step S213), the processing proceeds to step S202. Otherwise (NO in step S213), the processing returns to step S203.

Figure 3:
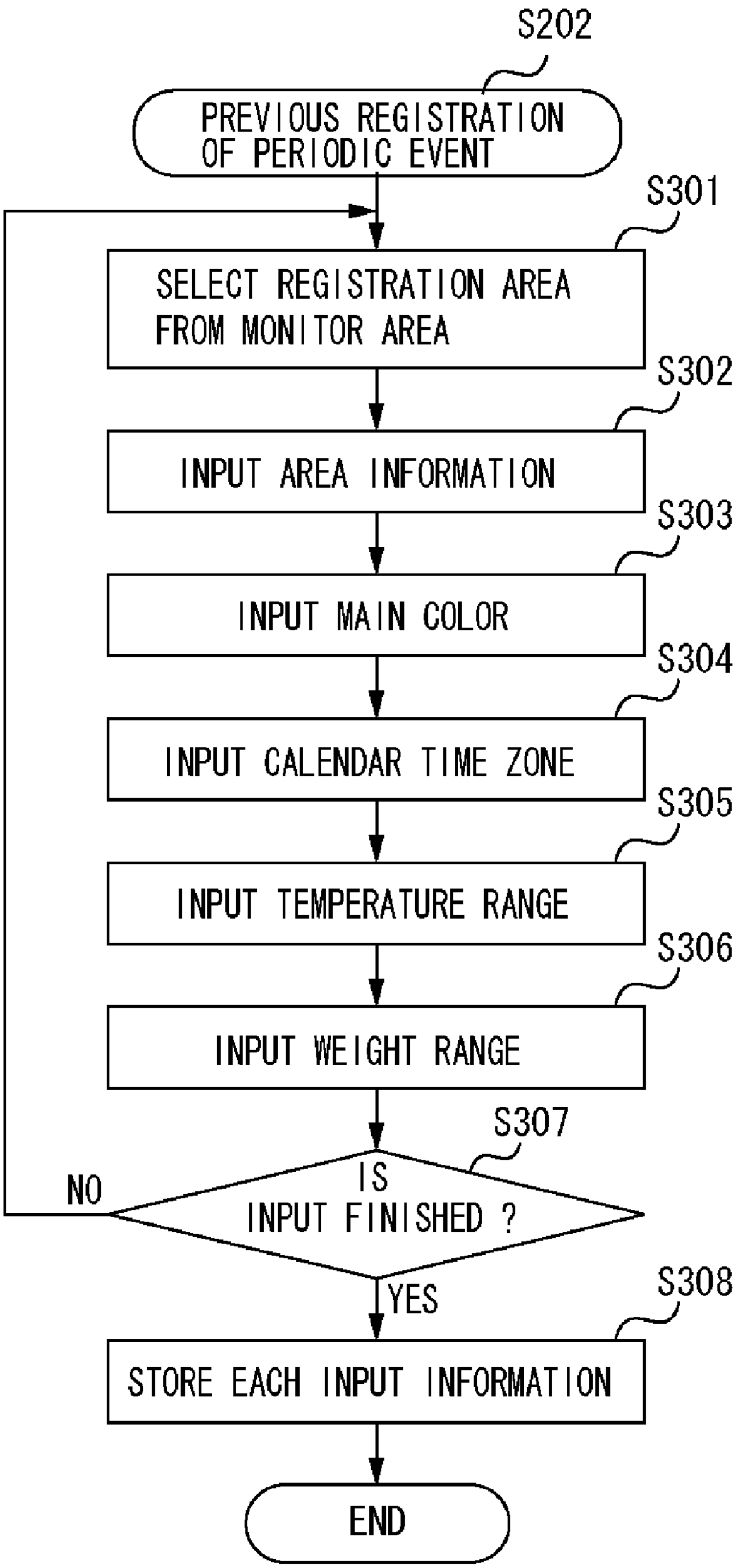
FIG. 3 is a flow chart for registering a periodic event.

FIG. 3 is a flow chart for registering an event in the periodic event storage unit 106 in step S202 illustrated in FIG. 2. FIGS. 4A to 4D are schematic diagrams illustrating procedures for previously registering a periodic event. The previous registration is executed by the main control unit 111 by controlling the display of the display unit 108 and the input of the operation unit 109.

The previous registration may be executed by remote control using the display unit and the operation unit in the PC connected through the network interface unit 110 illustrated in FIG. 1.

Figure 4A:
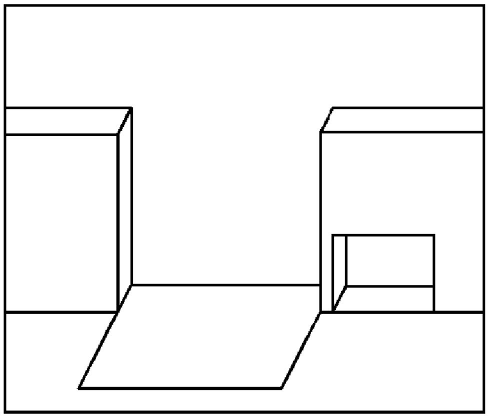
FIGS. 4A to 4D illustrate the registration of a periodic event.
Figure 4B:
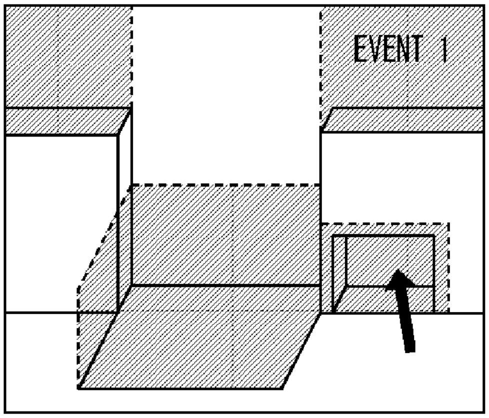

In step S301, if an image in the management area illustrated in FIG. 4A is monitored, a registration area selection screen including a registration area and an arrow as illustrated in FIG. 4B is displayed on the display unit 108 and a user enables selecting the registration area from a monitor area. The image in the management area is the background image stored in the reference background image storage unit 102.

Other images such as any still picture taken when a change does not occur may be used as the image in the management area. In the present exemplary embodiment, the user issues instructions through a mouse of the operation unit 109 while viewing the background image to move the arrow toward a shaded area at a lower right portion, for example, as illustrated in FIG. 4B. A corresponding area is selected in the position where the arrow is moved.

Figure 4C:
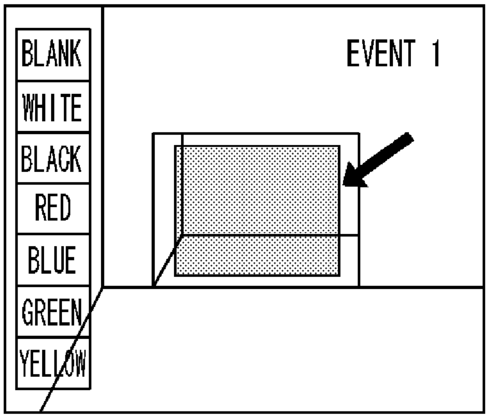

In step S302, the selected area is expanded and displayed. Area information such as position, size, shape, and range is input in response to user's operation related to the area. The area information as to the shaded area is input according to the user's operation of the arrow, when the shaded area at the lower right portion is expanded and displayed, in an area designation screen as illustrated in FIG. 4C.

In step S303, the determination of the area information by the operation of the user allows the user to input a main color in the determined range. As illustrated in FIG. 4C, the user selects a color from a color menu on the left, for example, and inputs it.

Figure 4D:
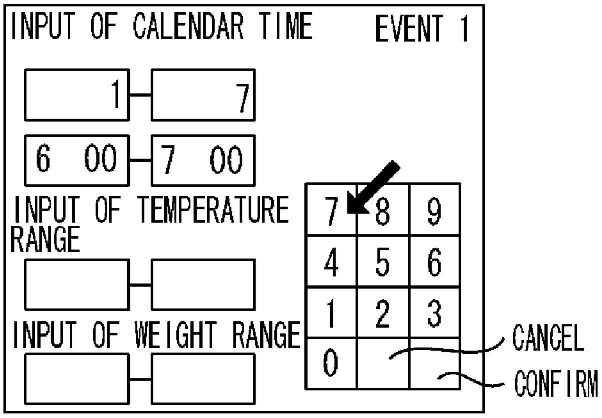

The area designation screen is switched to a numerical information designation screen illustrated in FIG. 4D where a calendar time zone, a temperature range, and a weight range are set by the operation of the user. Each numerical value is input according to the result that the user operates the mouse or the keyboard of the operation unit 109.

In step S304, calendar and time zone are input according to the operation of the user. In FIG. 4D, as illustrated in the first and the second left frame, for example, the seven days of the week zone and the time zone are input.

In step S305, a temperature range is input according to the operation of the user. As illustrated in FIG. 4D, the temperature range is input to the third left frame, for example. In step S306, a weight range is input according to the operation of the user. As illustrated in FIG. 4D, the weight range is input to the fourth left frame, for example.

In step S307, it is determined whether a request for terminating the registration is input. If the request is input (YES in step S307), the processing proceeds to step S308. Otherwise (NO in step S307), the processing proceeds to step S301.

All the pieces of information described above do not always need to be input. At least a calendar time zone, a position, and a size may be registered.

In step S308, the main control unit 111 stores each piece of input information as to each area stored in an internal memory according to the various setting inputs in the periodic event storage unit 106. Then, the processing of the present flow is terminated.

Figure 5:
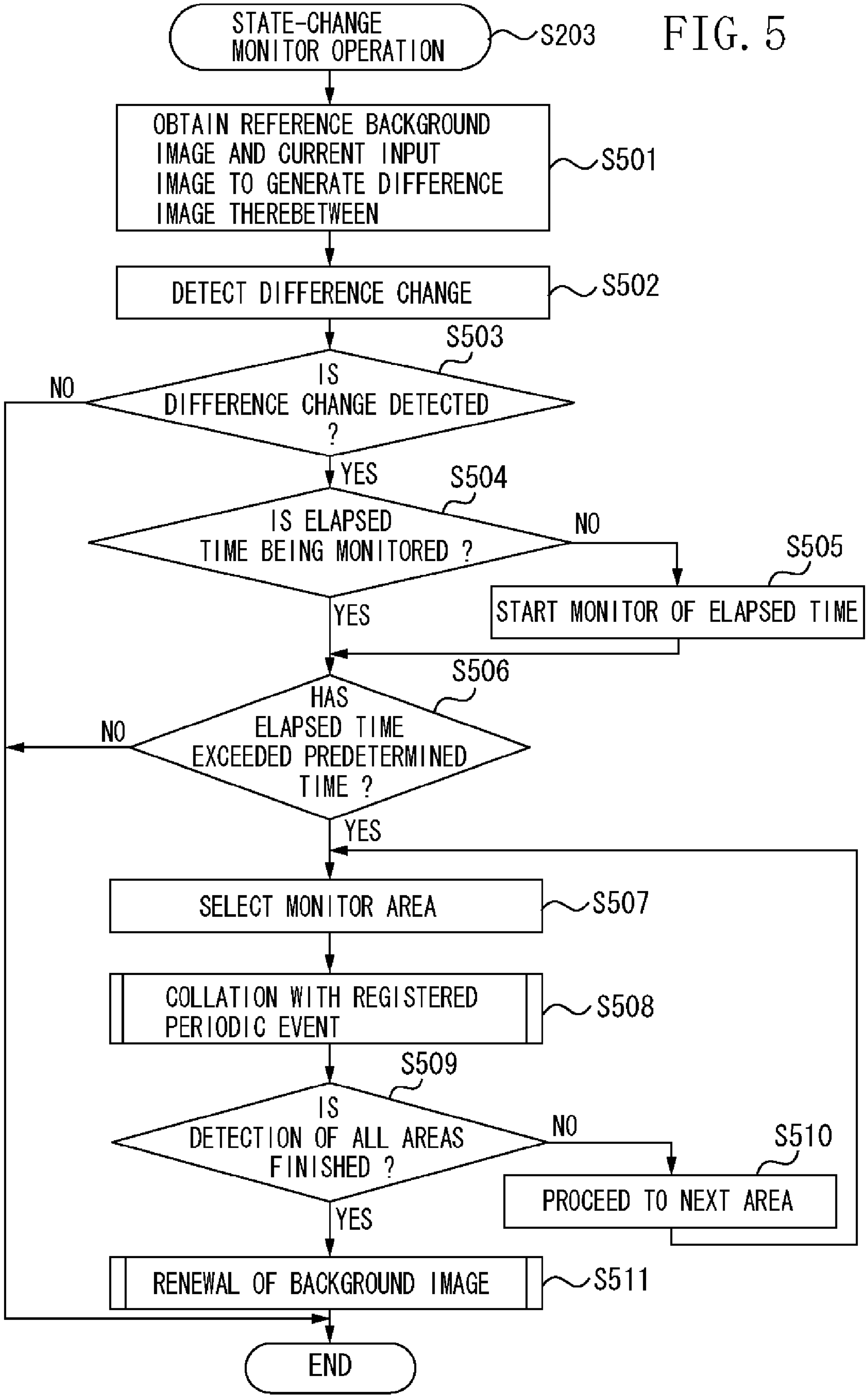
FIG. 5 is a flow chart illustrating an operation of monitoring a change in state.

FIG. 5 is a flow chart for the operation of monitoring a change in state performed in step S203 illustrated in FIG. 2.

In step S501, the main control unit 111 obtains a reference background image and a current input image to generate a difference image therebetween. In step S502, the main control unit 111 detects a difference change in the difference image.

In step S503, it is determined whether the difference change is detected. If the difference change is detected (YES in step S503), the processing proceeds to step S504. Otherwise (NO in step S503), the processing is terminated.

In step S504, it is determined whether an elapsed time during which the difference change is continued to be detected is being monitored. If the elapsed time is being monitored (YES in step S504), the processing proceeds to step S506. Otherwise (NO in step S504), the processing proceeds to step S505.

In step S504, if the elapsed time is not being monitored (NO in step S504), in other words, if another object is placed, then, in step S505, the monitoring of the elapsed time is started and the processing proceeds to step S506.

In step S506, it is determined whether the elapsed time exceeds a predetermined time. If the elapsed time exceeds the predetermined time (YES in step S506), in other words, if another object is left unattended for a predetermined time, the processing proceeds to step S507. On the other hand, if the elapsed time does not exceed the predetermined time (NO in step S506), the processing is terminated.

In step S507, one monitor area is selected from among the monitor areas registered in the periodic event storage unit 106 and the processing proceeds to step S508. In step S508, selected monitor area is collated with the registered periodic event, and the processing proceeds to step S509. Detailed processing performed in step S509 is described below referring to FIG. 6.

In step S509, it is determined whether the monitoring of all the state-change monitor areas is finished. If the monitoring is finished (YES in step S509), the processing proceeds to step S511. Otherwise (NO in step S509), the processing proceeds to step S510.

In step S510, the monitoring of the next state-change monitor area is started, and the processing proceeds to step S507. In step S511, the background image is updated according to the results of the difference detection and the collation, and the processing is terminated. Detailed processing in step S511 is described below referring to FIG. 7.

Figure 6:
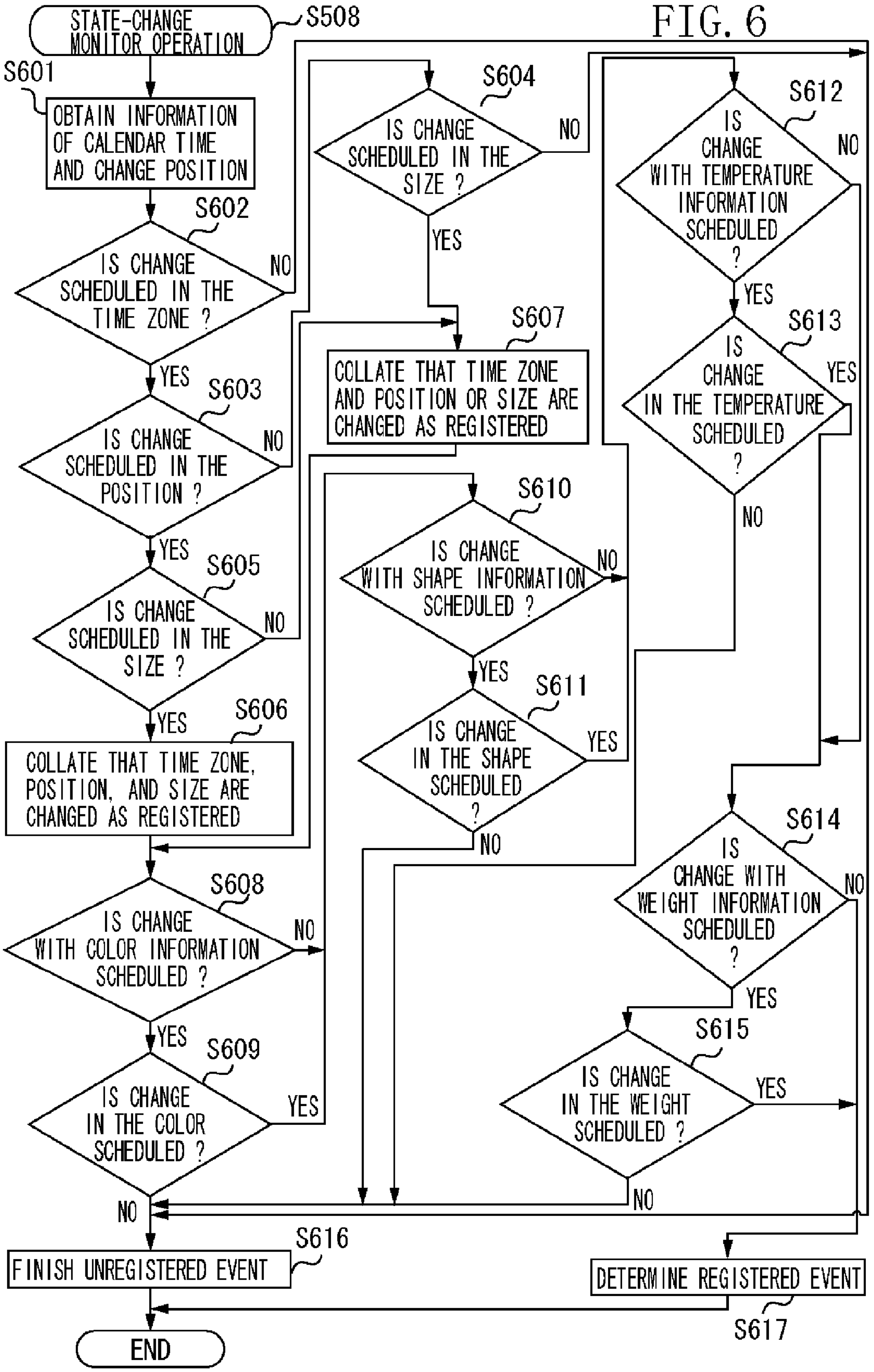
FIG. 6 is a flow chart illustrating a collation of a registered periodic event.

FIG. 6 is a flow chart for collating the registered periodic event in step S508 illustrated in FIG. 5.

In step S601, calendar time information such as a date, a day of the week, time, which are detected in a change instate of the selected monitor area and various pieces of information as to a change position, are obtained. The term "various pieces of information" may be referred to as detected changed position, changed size, changed color, changed shape, temperature information, weight information, and the information as to the periodic event registered in step S202 in FIG. 2.

In steps S602 to S615, the various pieces of information are collated with each other between the time of detecting a change and the time of registering a change to determine whether the detected change in state is a registered periodic event.

In step S602, it is determined whether a change is scheduled in a corresponding time zone. If the change is scheduled (YES in step S602), the processing proceeds to step S603. If the change is not scheduled (NO in step S602), the processing proceeds to step S616.

In step S603, it is determined whether a change is scheduled in a corresponding position. If the change is scheduled (YES in step S603), the processing proceeds to step S605. If the change is not scheduled (NO in step S603), the processing proceeds to step S604.

In step S604, it is determined whether a change in corresponding size is scheduled. If the change is scheduled (YES in step S604), the processing proceeds to step S607. If the change is not scheduled (NO in step S604), the processing proceeds to step S616.

In step S605, it is determined whether a change in corresponding size is scheduled. If the change is scheduled (YES in step S605), the processing proceeds to step S606. If the change is not scheduled (NO in step S605), the processing proceeds to step S607.

In step S606, it is determined that three conditions of a time zone, position, and size are changed as registered, and the processing proceeds to step S608. In step S607, it is determined that two conditions of a time zone and position or size are changed as registered, and the processing proceeds to step S608.

In step S608 and subsequent steps, the collation condition is made further detailed. In step S608, as the collation condition, it is determined whether a change with color information is scheduled. If the change is scheduled (YES in step S608), the processing proceeds to step S609. If the change is not scheduled (NO in step S608), the processing proceeds to step S610. In step S609, it is determined whether a change in corresponding color is scheduled. If the change is scheduled (YES in step S609), the processing proceeds to step S610. If the change is not scheduled (NO in step S609), the processing proceeds to step S616.

In step S610, as the collation condition, it is determined whether a change with shape information is scheduled. If the change is scheduled (YES in step S610), the processing proceeds to step S611. If the change is not scheduled (NO in step S610), the processing proceeds to step S612. In step S611, it is determined whether a change in corresponding shape is scheduled. If the change is scheduled (YES in step S611), the processing proceeds to step S612. If the change is not scheduled (NO in step S611), the processing proceeds to step S616.

In step S612, as the collation condition, it is determined whether a change with temperature information is scheduled. If the change is scheduled (YES in step S612), the processing proceeds to step S613. If the change is not scheduled (NO in step S612), the processing proceeds to step S614. In step S613, it is determined whether a change in corresponding temperature is scheduled. If the change is scheduled (YES in step S613), the processing proceeds to step S614. If the change is not scheduled (NO in step S613), the processing proceeds to step S616.

In step S614, as the collation condition, it is determined whether a change with weight information is scheduled. If the change is scheduled (YES in step S614), the processing proceeds to step S615. If the change is not scheduled (NO in step S614), the processing proceeds to step S617. In step S615, it is determined whether a change in corresponding weight is scheduled. If the change is scheduled (YES in step S615), the processing proceeds to step S617. If the change is not scheduled (NO in step S615), the processing proceeds to step S616.

In step 616, as a result of the collation, it is determined that the event is an unregistered event, which is not changed as registered, and the processing is terminated. In step 617, as a result of the collation, it is determined that the event is a registered event, which is changed as registered, and the processing is terminated.

Figure 7:
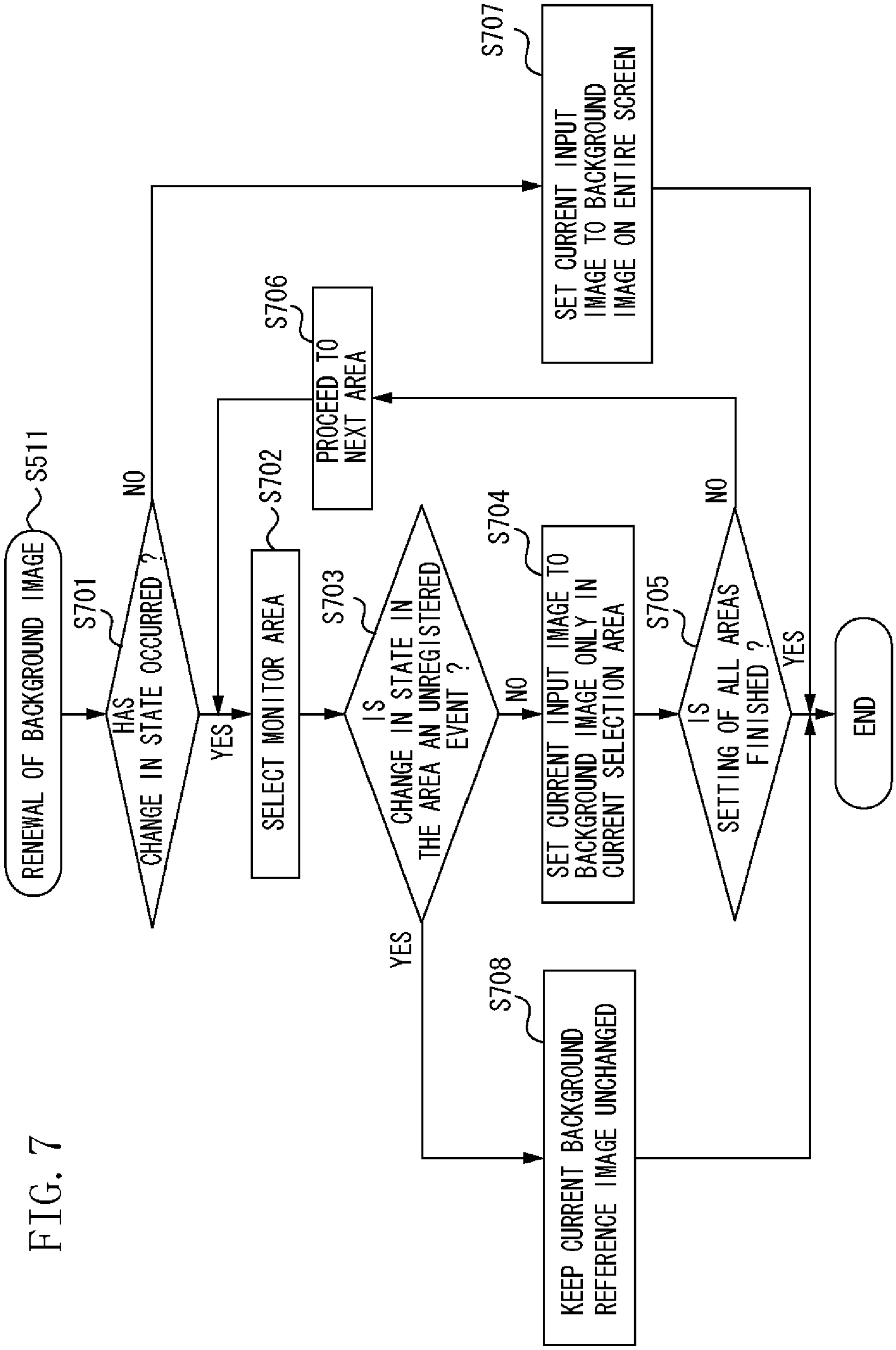
FIG. 7 is a flow chart for updating of a background image.

FIG. 7 is a flow chart for updating the background image in step S511 in FIG. 5.

In step S701, it is determined whether a change in state occurs. If the change occurs (YES in step S701), the processing proceeds to step S702. If the change does not occur (NO in step S701), the processing proceeds to step S707. In step S702, a monitor area is selected, and the processing proceeds to step S703. In step S703, it is determined whether the change in state is an unregistered event. If the change is an unregistered event (YES in step S703), the processing proceeds to step S708. If the change is not an unregistered event (NO in step S703), the processing proceeds to step S704.

In step S704, a current input image is set to a background image only in the selected monitor area, and the processing proceeds to step S705. In step S705, it is determined whether the setting of all the state-change monitor areas is finished. If the setting is finished (YES in step S705), the processing is terminated. Otherwise (NO in step S705), the processing proceeds to step S706.

In step S706, the setting of the next state-change monitor area is started. The processing proceeds to step S702. In step S707, the current input image is set to the background image on the entire screen, and the processing is terminated. In step S708, the reference image is set to be kept unchanged, and the processing is terminated.

Figure 8:
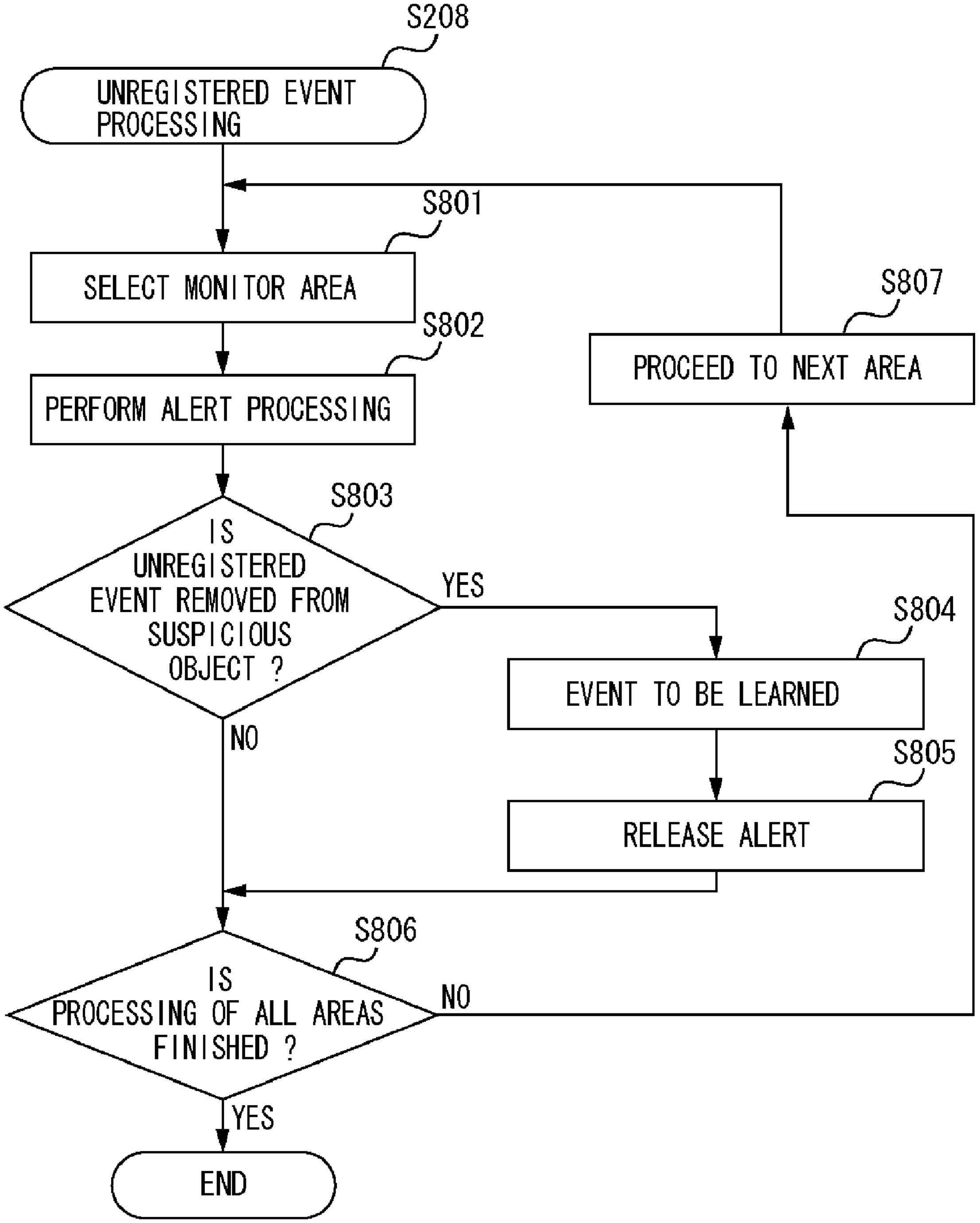
FIG. 8 is a flow chart for processing an unregistered event.

FIG. 8 is a flow chart for processing an unregistered event in step S208 in FIG. 2.

In step S801, a monitor area is selected, and the processing proceeds to step S802. In step S802, an alert processing is performed, and the processing proceeds to step S803. In step S803, a user approves the occurrence of an unregistered event by key input (not illustrated) from the operation unit 109 and monitors whether the unregistered event is removed from suspicious objects. If the unregistered event is removed (YES in step S803), the processing proceeds to step S804. Otherwise (NO in step S803), the processing proceeds to step S806.

In step S804, the unregistered event is set as an event to be learned. The processing proceeds to step S805. In step S805, an alert is released. The processing proceeds to step S806.

In step S806, it is determined whether the processing of all the state-change monitor areas is finished. If the processing is finished (YES in step S806), the processing is terminated. Otherwise (NO in step S806), the processing proceeds to step S807. In step S807, the processing of the next state-change monitor area is started. The processing proceeds to step S801.

Figure 9:
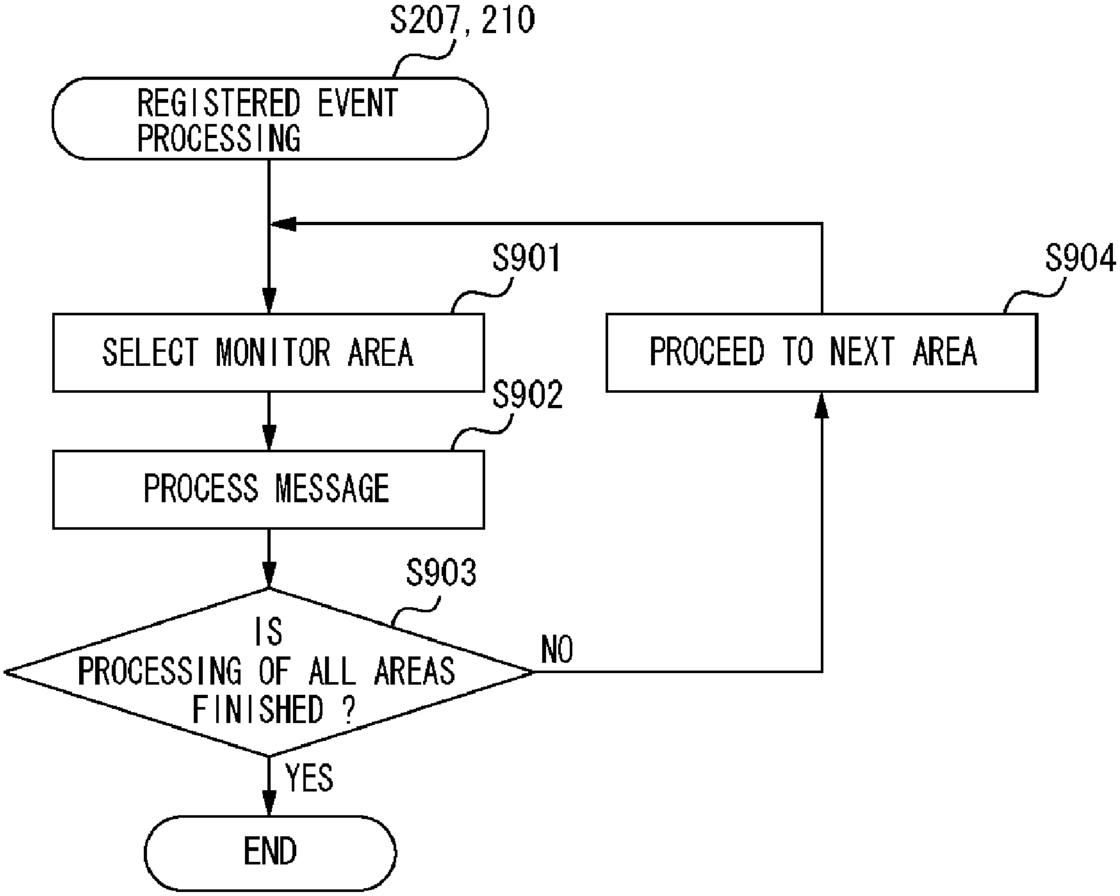
FIG. 9 is a flow chart for processing a registered event.

FIG. 9 is a flow chart for processing a registered event in steps S207 and S210 in FIG. 2.

In step S901, a monitor area is selected and the processing proceeds to S902. In step S902, a message is processed. Then, the processing proceeds to S903.

In step S903, it is determined whether the processing of all the state-change monitor areas is finished. If the processing is finished (YES in step S903), the processing is terminated. Otherwise (NO in step S903), the processing proceeds to step S904. In step S904, the processing of the next state-change monitor area is started, and the processing proceeds to step S901.

Figure 10:
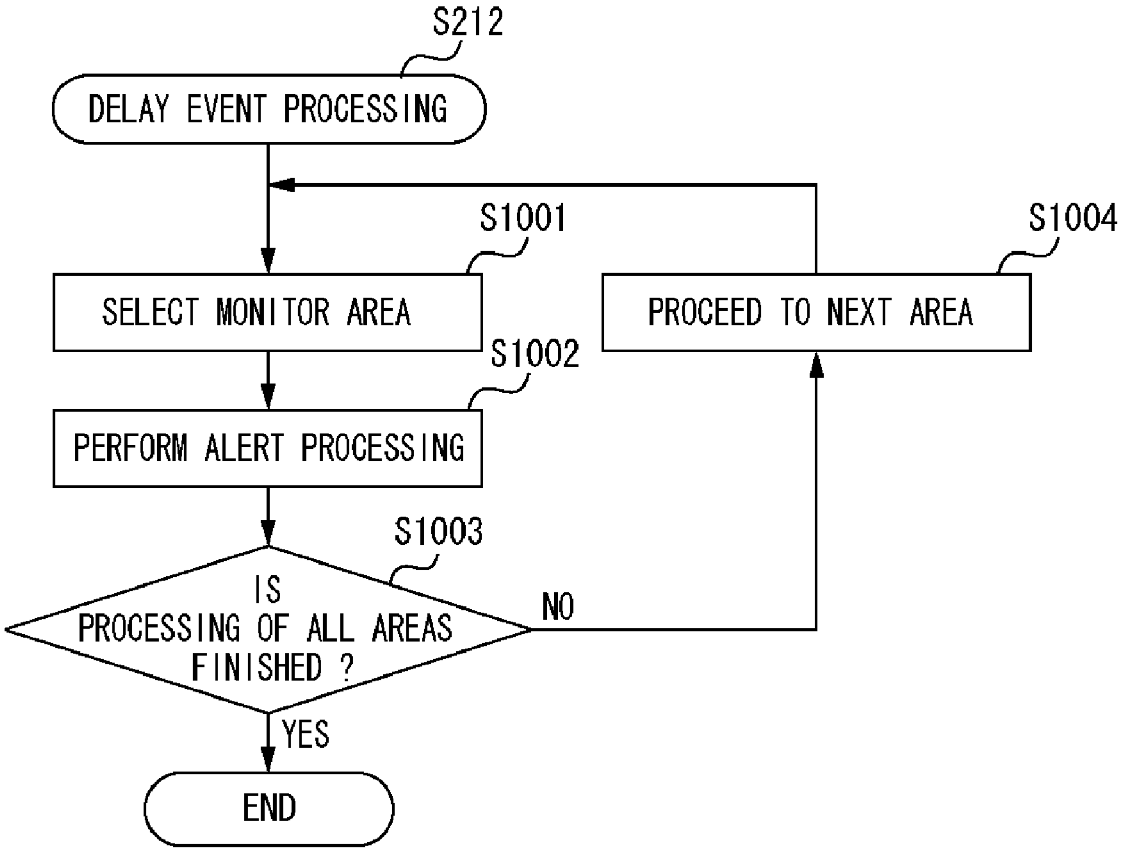
FIG. 10 is a flow chart for processing a delayed event.

FIG. 10 is a flow chart for processing a delayed event in step S212 in FIG. 2.

In step S1001, a monitor area is selected, and the processing proceeds to S1002. In step S1002, an alert processing is performed, and the processing proceeds to step S1003. In step S1003, it is determined whether the processing of all the state-change monitor areas is finished. If the processing is finished (YES in step S1003), the processing is terminated. Otherwise (NO in step S1003), the processing proceeds to step S1004. In step S1004, the processing of the next state-change monitor area is started, and the processing proceeds to step S1001.

Figure 11:
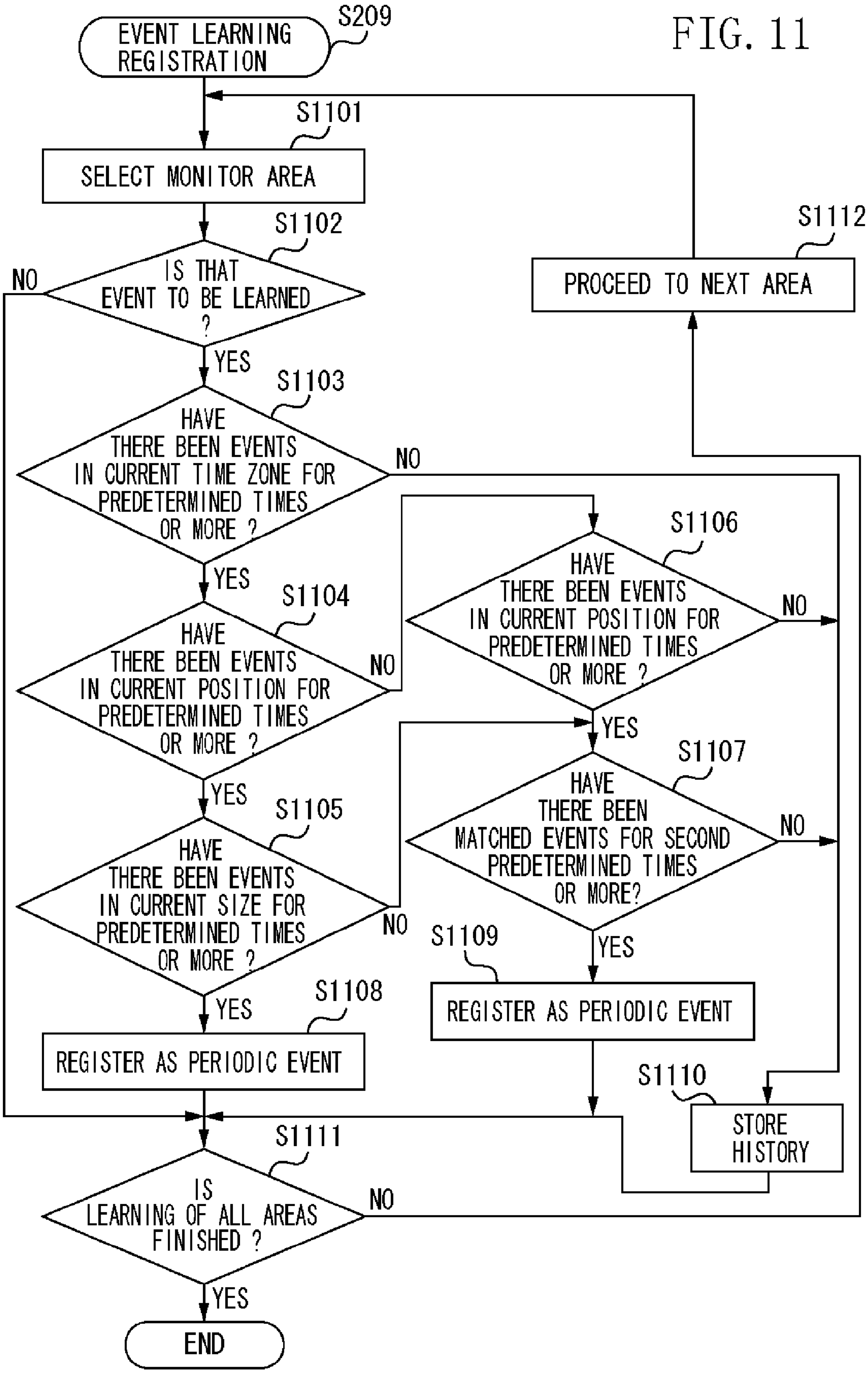
FIG. 11 is a flow chart for registering event learning.

FIG. 11 is a flow chart for registering an event learning in step S209 in FIG. 2.

In step S1101, a monitor area is selected, and the processing proceeds to S1102. In step S1102, it is determined whether an event is a target to be learned. If the event is the target to be learned (YES in step S1102), the processing proceeds to step S1103. Otherwise (NO in step S1102), the processing proceeds to step S1111.

In step S1103, it is determined whether events have occurred the predetermined number of times or more in the current time zone. If there have been the events (YES in step S1103), the processing proceeds to step S1104. Otherwise (NO in step S1103), the processing proceeds to step S1110.

In step S1104, it is determined whether events have occurred the predetermined number of times or more in the current position. If the events have occurred the predetermined number of times or more (YES in step S1104), the processing proceeds to step S1105. Otherwise (NO in step S1104), the processing proceeds to step S1106. In step S1105, it is determined whether events have occurred the predetermined number of times or more in the current size. If the events have occurred the predetermined number of times or more (YES in step S1105), the processing proceeds to step S1108. Otherwise (NO in step S1105), the processing proceeds to step S1107.

In step S1106, it is determined whether events have occurred the predetermined number of times or more in the current size. If the events have occurred the predetermined number of times or more (YES in step S1106), the processing proceeds to step S1107. Otherwise (NO in step S1106), the processing proceeds to step S1110.

In step S1107, it is determined whether events have occurred the second predetermined number of times or more, which coincide with each other in time zone and position or time zone and size. If the events have occurred the second predetermined number of times or more (YES in step S1107), the processing proceeds to step S1109. Otherwise (NO in step S1107), the processing proceeds to step S1110.

In step S1108, there have occurred the periodic events, which coincide with each other in three conditions of time zone, position, and size, the predetermined number of times or more, so that the events are learned and registered as a periodic event, and the processing proceeds to step S1111.

In step S1109, there have occurred the periodic events, which coincide with each other in two conditions (time zone and position or time zone and size), the predetermined number of times or more, so that the events are learned and registered as a periodic event, and the processing proceeds to step S1111.

In step S1110, a history is stored, and the processing proceeds to step S1111. In step S1111, it is determined whether the learning of all the state-change monitor areas is finished. If the learning is finished (YES in step S1111), the processing is terminated. Otherwise (NO in step S1111), the processing proceeds to step S1112. In step S1112, the learning of the next state-change monitor area is started, and the processing proceeds to step S1101.

Figure 12A:
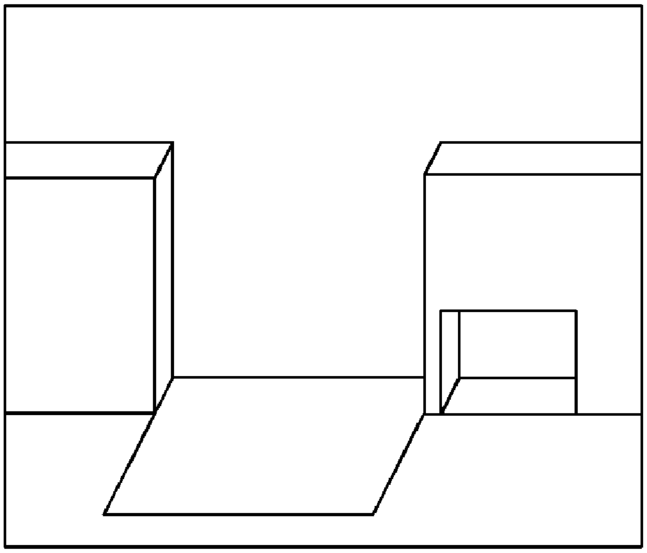
FIGS. 12A to 12C illustrate an operation of monitoring a change in state in the case where a change in an image does not occur.
Figure 12B:
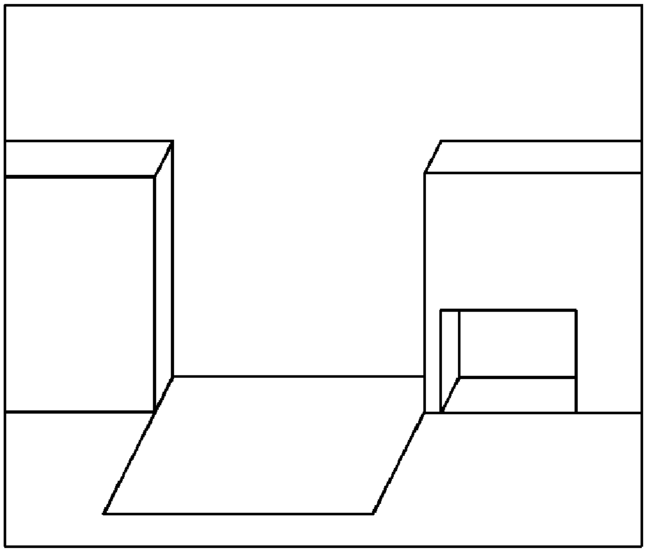
Figure 12C:
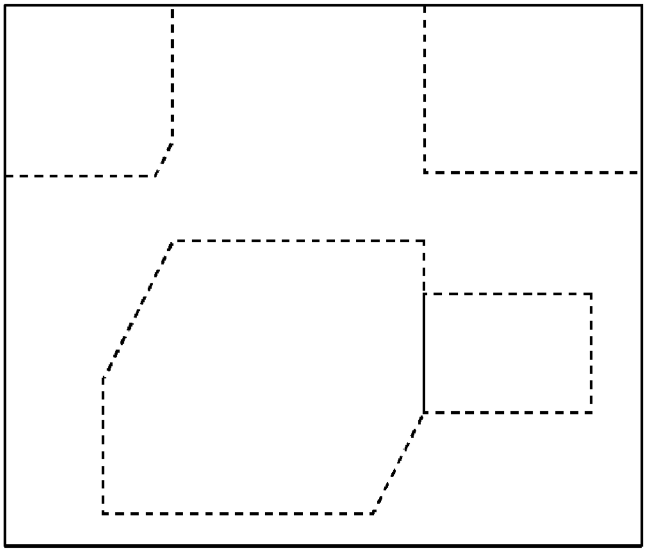

FIGS. 12A to 12C illustrate an operation of monitoring a change in state in FIG. 2 in a case where a change in an image does not occur. FIG. 12A illustrates a background image to be compared. FIG. 12B is an image illustrating a current state. FIG. 12C is a difference image between FIGS. 12A and 12B. A plurality of areas indicated by a broken line are areas in which a change in state is detected. Since the current image is not changed with respect to the background image, a difference image is not generated.

Figure 13A:
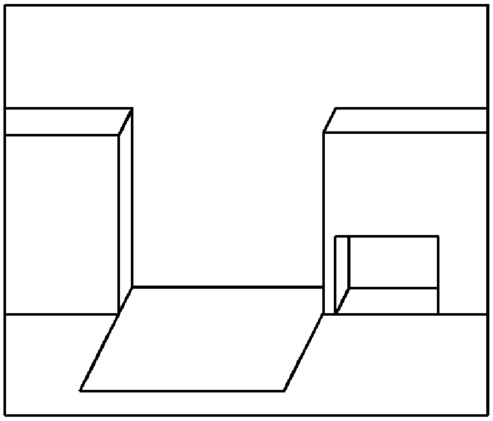
FIGS. 13A to 13D illustrate the operation of monitoring a change in state in the case where an object is placed.
Figure 13B:
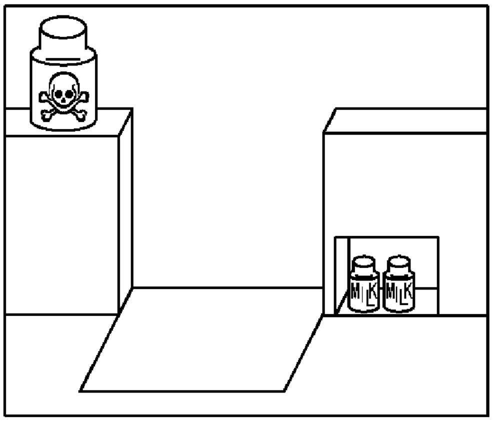
Figure 13C:
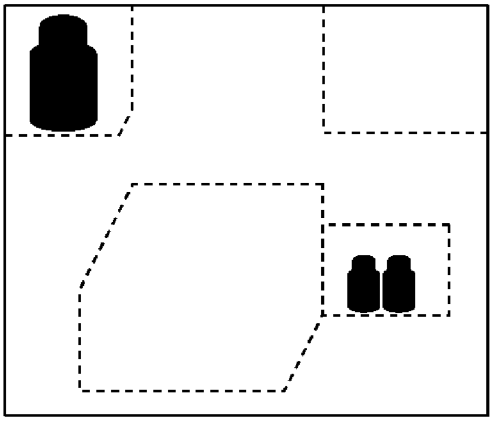

FIGS. 13A to 13D illustrate the operation of monitoring a change in state in FIG. 2 in a case in which an object is placed. FIG. 13A illustrates a background image to be compared. FIG. 13B is an image illustrating a current state in which objects are placed in the upper left and the lower right positions. FIG. 13C is a difference image between FIGS. 13A and 13B. Since the current image is changed with respect to the background image, the difference images appear in the upper left and the lower right positions.

Figure 13D:
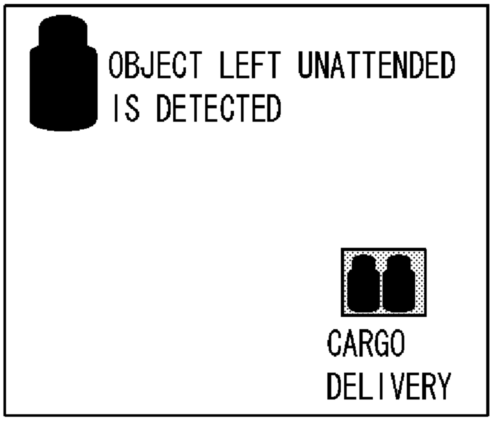

FIG. 13D is an image to be collated with a registered periodic event. For example, if a milk bottle to be delivered at the lower right position every morning is registered, a change in the lower right position is collated as the registered event. However, a change in the upper left position is not registered and the change is collated as an unregistered event.

As a warning operation, the main control unit 111 causes the display unit 108 to display a phrase "Object left unattended is detected" and "Usual cargo is arrived", which are superposed on the difference images in the upper left and the lower right position respectively.

Figure 14A:
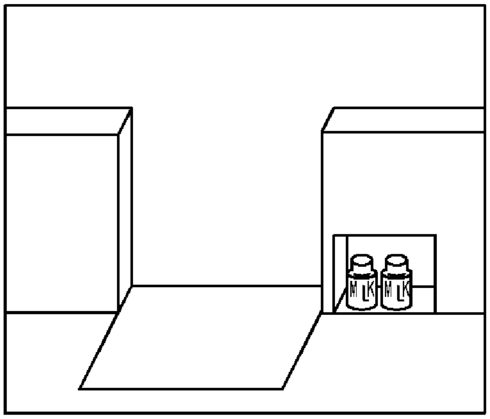
FIGS. 14A to 14D illustrate an operation of monitoring a change in state in the case where an object is removed.
Figure 14B:
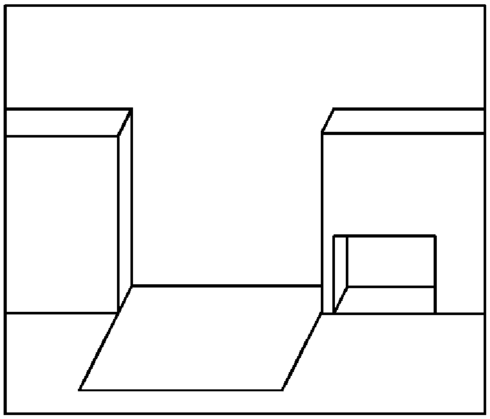
Figure 14C:
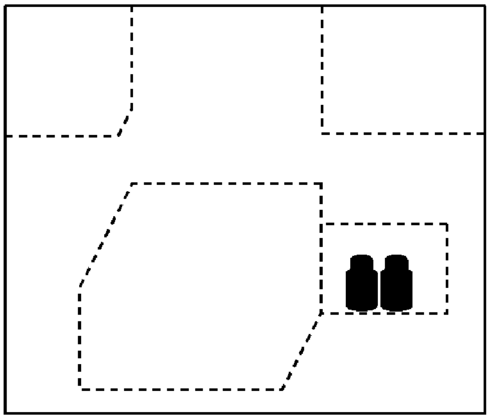
Figure 14D:
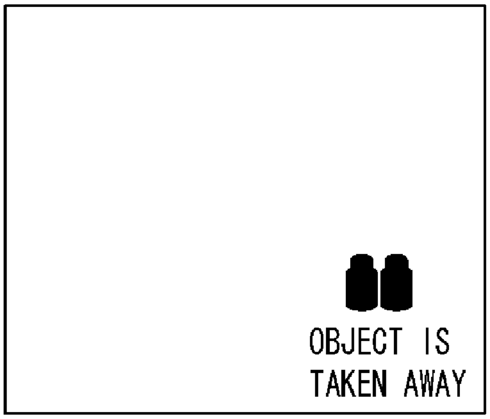

FIGS. 14A to 14D illustrate an operation of monitoring a change in state in FIG. 2 in a case in which an object is removed. FIG. 14A illustrates a background image to be compared. FIG. 14B is an image illustrating a current state where objects in the lower right position are removed. FIG. 14C is a difference image between FIGS. 14A and 14B. FIG. 14D is an image to be collated with a registered periodic event.

For example, a time zone is registered during which a delivered milk bottle is fetched every morning. If a change occurs before the registered time zone in the lower right position, which is not registered, so that the events do not agree with each other.

If a change in state occurs earlier than the registered time zone, an object may be taken away. Therefore, as a warning operation, the main control unit 111 causes the display unit 108 to display a phrase "The object is taken away earlier than schedule", which is superposed on the difference image in the lower right position.

Figure 15A:
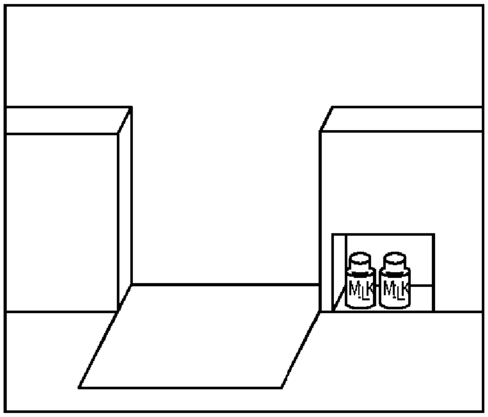
FIGS. 15A to 15D illustrate an operation of monitoring a change in state in the case where an object is removed.
Figure 15B:
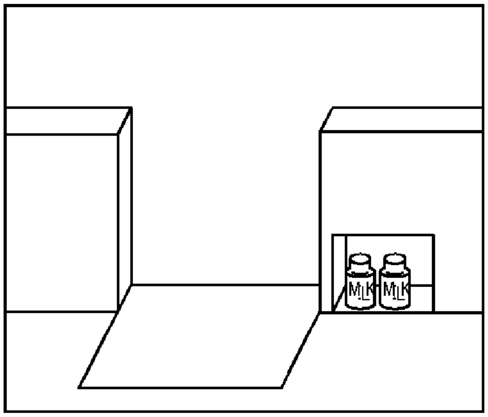
Figure 15C:
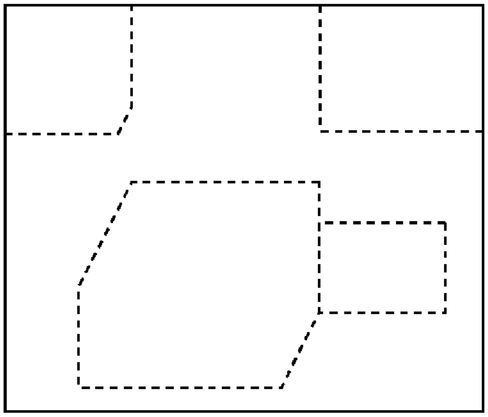
Figure 15D:
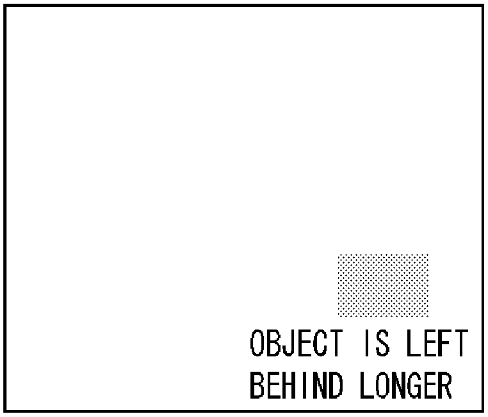

FIGS. 15A to 15D illustrate an operation of monitoring a change in state in FIG. 2 in a case in which an object is removed. FIG. 15A illustrates a background image to be compared. FIG. 15B is an image illustrating a current state in which objects in the lower right position are not removed. FIG. 15C is a difference image between FIGS. 15A and 15B. FIG. 15D is an image to be collated with a registered periodic event.

For example, a predetermine time zone is registered during which a delivered milk bottle is fetched every morning. If a change has occurred longer than the predetermined time period, the events do not agree with each other. If a change in state has occurred longer than the registered time period, an object may be left behind. Therefore, as a warning operation, the main control unit 111 causes the display unit 108 to display a phrase "Object is left behind longer", which is superposed on the difference image in the lower right position.

Figure 16A:
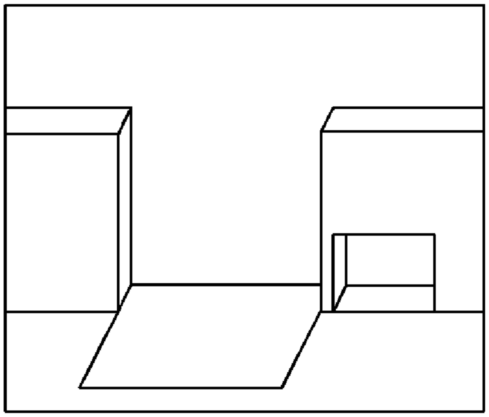
FIGS. 16A to 16D illustrate an operation of monitoring a change in state in the case where the occurrence of a periodic event is waited.
Figure 16B:
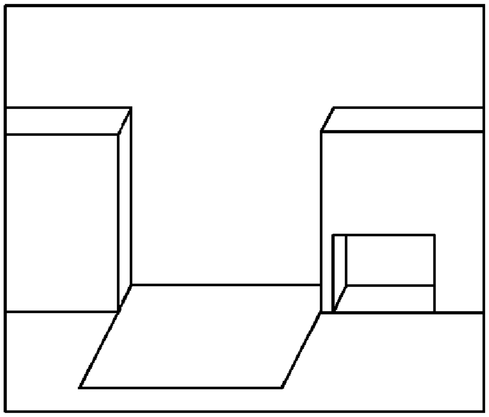
Figure 16C:
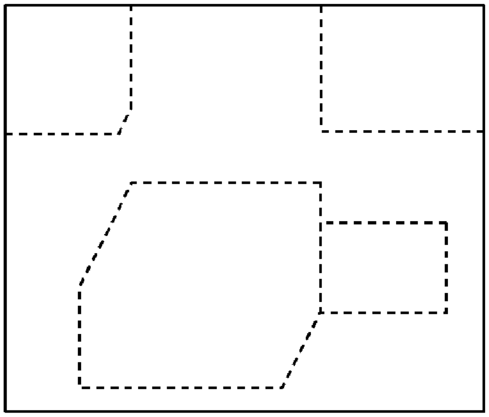
Figure 16D:
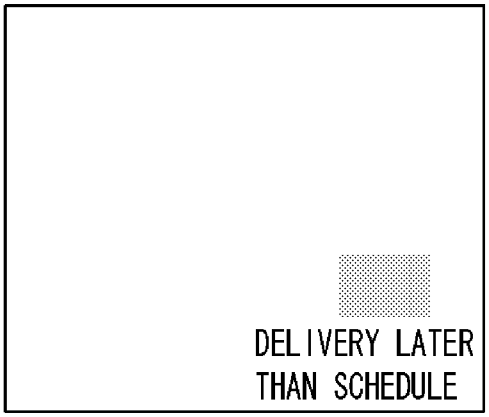

FIGS. 16A to 16D illustrate an operation of monitoring a change in state in FIG. 2 in a case in which the occurrence of a periodic event is waited. FIG. 16A illustrates a background image to be compared. FIG. 16B is an image illustrating a current state in which a periodic event does not occur to objects in the lower right position. FIG. 16C is a difference image between FIGS. 16A and 16B. FIG. 16D is an image to be collated with a registered periodic event.

For example, a time zone is registered during which a milk bottle is delivered every morning. If a change does not occur in the corresponding time zone in the lower right position, the events do not agree with each other. If a change in state does not occur in the registered time zone, a milkman may forget to deliver a milk bottle. Therefore, as a warning operation, the main control unit 111 causes the display unit 108 to display a phrase "Delivery later than schedule occurs", which is superposed on the difference image in the lower right position.

Although FIG. 14C is similar to FIG. 15C, it is obvious that distinctions can be made as to whether a periodic event periodically disappears or appears with reference to the registered event.

As described above, the present invention has an effect of enabling the issuance of a message of "cargo delivery" if a periodic delivery appears as scheduled, and the announcement of an alert on "suspicious object is left unattended" if a non-periodic object left unattended appears.

Furthermore, the present invention has an effect of enabling the announcement of an alert of "Object is taken away" if an object is taken away earlier than a scheduled time, the issuance of a message of "Object can be fetched" if a periodic delivery is fetched as scheduled, and the announcement of an alert of "Forget to fetch object" if an object is left behind longer than schedule.

Still furthermore, the present invention has an effect of enabling the announcement of an alert of "Forget to deliver" if a periodic delivery does not appear as scheduled.

Although the above exemplary embodiments describe the examples in which the display unit 108 displays characters superposed on the difference image as a warning operation, the characters may be superposed on the input current image. In this case, for example, a translucent warning color may be superposed and displayed on the input current image corresponding to the difference image area where a suspicious object seems to be included to inform a user thereof.

Although the above exemplary embodiments describe the examples in which characters are displayed on the display unit 108 as a warning operation, the present invention is not limited to the display of the characters. The warning may be displayed by using figures. In addition, the warning may be performed by blinking a light emitting diode or notifying through voice as well as displaying by figures.

In the above exemplary embodiments, although various warnings are performed in a single system, the warnings may be performed on display units included in other terminals connected through a network.

As described above, the present exemplary embodiments can discriminate the previously registered periodic movement of an object from the non-periodic movement of an object, and can set the types of warning according to the user's monitoring intention. Thereby, an effect of reducing erroneous warnings to continue an efficient monitoring can be obtained.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-316036 filed Dec. 11, 2008, which is hereby incorporated by reference herein in its entirety.

What is claimed is:

1. An information processing apparatus comprising:

a background image storage unit configured to store a background image;

a periodic event storage unit configured to store conditions for the occurrence of a periodic event and information as to the time of the occurrence of the periodic event;

an image input unit configured to input an image;

an image comparison unit configured to compare the background image stored in the background image storage unit with an input image input from the image input unit to obtain a difference;

a determination unit configured to determine, after change in the difference and time of the occurrence of the change is detected with us of the comparison by the image comparison unit, whether a predetermined time has elapsed or not;

a periodic event collation unit configured to collate a change in the difference and time of the change with the conditions for the occurrence of the periodic event and the information as to the time of the occurrence of the periodic event stored in the periodic event storage unit in order to determine whether the change of the input image in state is the periodic or the non-periodic movement of an object when it is determined that the predetermined time has elapsed by the determination unit; and a selection unit configured to select, according to the result of a determination by the periodic event collation unit, any one of operations according to the periodic or the non-periodic movement of an object, and wherein even when the periodic event collation unit determines that the change in state is the non-periodic movement of an object and when the movement of an object is repeated the predetermined number of times or more, the conditions and the information stored in the periodic event storage unit are changed so that the periodic event collation unit can determine that the movement of the object is the periodic movement of the object.

2. The information processing apparatus according to claim 1, wherein the selection unit is configured not to select a warning operation for the appearance and the disappearance of an object when it is determined that a change in state is the periodic movement of an object, and is configured to select the warning operation when it is determined that a change in state is the non-periodic movement of an object.

3. The information processing apparatus according to claim 2, wherein the warning operation includes a display using a figure, light, voice, or character.

4. The information processing apparatus according to claim 1, wherein the selection unit is configured to select the warning operation when the movement of an object occurs earlier or later than a scheduled time at which an object is periodically moved.

5. The information processing apparatus according to claim 1, wherein the selection unit is configured to select the warning operation when the movement of an object does not occur even after a scheduled time has passed at which an object is periodically moved.

6. The information processing apparatus according to claim 1, wherein the conditions for the occurrence include conditions in which the position of change in the difference is included in a predetermined area.

7. The information processing apparatus according to claim 1, wherein the conditions for the occurrence includes conditions in which a size of change in the difference is included in a predetermined size.

8. The information processing apparatus according to claim 1, wherein the conditions for the occurrence include conditions in which the color of change in the difference is included in a predetermined color.

9. The information processing apparatus according to claim 1, wherein the conditions for the occurrence include conditions in which the shape of change in the difference is in a predetermined shape.

10. The information processing apparatus according to claim 1, wherein the conditions for the occurrence include conditions in which a temperature of change in the difference is within a predetermined temperature.

11. The information processing apparatus according to claim 1, wherein the conditions for the occurrence include conditions in which a weight of change in the difference is within a predetermined weight.

12. The information processing apparatus according to claim 1, wherein the periodic event collation unit is further configured to collate when it is determined that the predetermined time has elapsed by the determination unit.

13. An information processing method for an information processing apparatus configured to process an input image, the method comprising:

comparing a stored background image with the input image to obtain a difference;

determining, after change in the difference is detected, whether a predetermined time has elapsed or not;

collating a change in the difference and time of the occurrence of the change with conditions for the occurrence of a periodic event and information as to the time of occurrence of the periodic event, which are previously stored in a storage unit, to determine whether the change in state of the input image is the periodic or a non-periodic movement of an object when it is determined that the predetermined time has elapsed; and selecting, according to a result of the determination, any one of operations according to the periodic or the non-periodic movement of an object wherein even when the periodic event collation unit determines that the change in state is the non-periodic movement of an object and when the movement of an object is repeated the predetermined number of times or more, the conditions and the information stored in the periodic event storage unit are changed so that the periodic event collation unit can determine that the movement of the object is the periodic movement of the object.

14. The information processing method according to claim 13, further comprising performing the collating when it is determined that the predetermined time has elapsed.

* * * * *